United States Patent
Huang et al.

(10) Patent No.: US 10,169,914 B2
(45) Date of Patent: Jan. 1, 2019

(54) METHOD AND SYSTEM FOR INDOOR POSITIONING AND DEVICE FOR CREATING INDOOR MAPS THEREOF

(71) Applicant: Osense Technology Co., Ltd., Taipei (TW)

(72) Inventors: Jiung-Yao Huang, Taoyuan (TW); You-Kwang Wang, Taipei (TW)

(73) Assignee: Osense Technology Co., Ltd., Taipei (TW)

( * ) Notice: Subject to any disclaimer, the term of this patent is extended or adjusted under 35 U.S.C. 154(b) by 42 days.

(21) Appl. No.: 15/436,862

(22) Filed: Feb. 20, 2017

(65) Prior Publication Data

US 2018/0061126 A1 Mar. 1, 2018

Related U.S. Application Data

(60) Provisional application No. 62/379,753, filed on Aug. 26, 2016.

(30) Foreign Application Priority Data

Nov. 7, 2016 (TW) .............................. 105136161 A

(51) Int. Cl.
*G06T 19/00* (2011.01)
*G01S 5/02* (2010.01)
(Continued)

(52) U.S. Cl.
CPC .......... *G06T 19/003* (2013.01); *G01C 21/206* (2013.01); *G01S 5/0263* (2013.01);
(Continued)

(58) Field of Classification Search
CPC ....... G06T 19/003; G01S 5/0263; H04W 4/02
See application file for complete search history.

(56) References Cited

U.S. PATENT DOCUMENTS 8,823,734 B1 * 9/2014 Bailiang ................. G06T 17/05
345/418
2013/0096873 A1 4/2013 Rosengaus et al.
(Continued)

FOREIGN PATENT DOCUMENTS

CN 104333675 2/2015
TW 200907826 2/2009
(Continued)

OTHER PUBLICATIONS

Kim, Sunhyo, "SLAM in Indoor Environments using Omni-directional Vertical and Horizontal Line Features", Jan. 2008, SpringerLink, vol. 51, pp. 31-43 (Year: 2008).*
(Continued)

*Primary Examiner* — Barry Drennan
*Assistant Examiner* — Terrell M Robinson
(74) *Attorney, Agent, or Firm* — JCIPRNET

(57) ABSTRACT

An indoor positioning method, indoor positioning system and indoor maps creating device thereof are provided. The method includes converting a panorama image corresponding to an indoor environment into a plurality of perspective images, and extracting a plurality of reference feature points and descriptors of the reference feature points from the perspective images; taking a shooting position of the panorama image as an origin, and recoding a plurality of 3D reference coordinate values corresponding to a central position of each perspective images; calculating 3D coordinate values of the reference feature points base on the 3D reference coordinate values, and storing the 3D coordinate values and the descriptors of the reference feature points as an indoor map corresponding to the indoor environment. The method also includes determining a 3D target coordinate value of a portable electronic device with respect to the origin of the indoor maps in the indoor environment.

15 Claims, 7 Drawing Sheets

(51) Int. Cl.
*H04W 4/02* (2018.01)
*G01C 21/20* (2006.01)
*G06T 17/05* (2011.01)
*G06T 7/70* (2017.01)

(52) U.S. Cl.
CPC ............... *G06T 7/70* (2017.01); *G06T 17/05* (2013.01); *H04W 4/02* (2013.01); *G06T 2200/04* (2013.01)

(56) References Cited

U.S. PATENT DOCUMENTS

| | | | |
|---|---|---|---|
| 2013/0297205 A1 | 11/2013 | Kim et al. | |
| 2014/0315570 A1* | 10/2014 | Yun | H04W 4/043 455/456.1 |
| 2014/0323148 A1 | 10/2014 | Schmalstieg et al. | |
| 2015/0071524 A1 | 3/2015 | Lee | |
| 2015/0161476 A1* | 6/2015 | Kurz | G06K 9/4671 382/190 |
| 2016/0005229 A1* | 1/2016 | Lee | G06F 3/0488 345/419 |
| 2016/0371846 A1* | 12/2016 | Starns | G01C 11/02 |

FOREIGN PATENT DOCUMENTS

| | | |
|---|---|---|
| TW | 201319955 | 5/2013 |
| WO | 2011014053 | 2/2011 |

OTHER PUBLICATIONS

Wagner, Daniel, "Real-time panoramic mapping and tracking on mobile phones", Mar. 24, 2010, IEEE, pp. 211-218 (Year: 2010).*

Lourenco, Miguel, "Localization in indoor environments by querying omnidirectional visual maps using perspective images", Jun. 28, 2012, IEEE, pp. 2189-2195 (Year: 2012).*

Jiung-Yao Huang, et al., "A Fast Image Matching Technique for the Panoramic-based Localization," 2016 IEEE/ACIS 15th International Conference on Computer and Information Science, Jun. 2016, pp. 1-6.

Hisato Kawaji, et al., "An image-based indoor positioning for digital museum applications," 2010 16th International Conference on Virtual Systems and Multimedia, Oct. 2010, pp. 105-111.

"Office Action of Taiwan Counterpart Application," dated Nov. 8, 2017, p. 1-p. 6.

* cited by examiner

METHOD AND SYSTEM FOR INDOOR POSITIONING AND DEVICE FOR CREATING INDOOR MAPS THEREOF

CROSS-REFERENCE TO RELATED APPLICATION

This application claims the priority benefits of U.S. provisional application Ser. No. 62/379,753, filed on Aug. 26, 2016 and Taiwan application serial no. 105136161, filed on Nov. 7, 2016. The entirety of each of the above-mentioned patent applications is hereby incorporated by reference herein and made a part of this specification.

BACKGROUND OF THE PRESENT INVENTION

1. Field of the Invention

The present invention relates to an indoor positioning method, and particularly relates to an indoor positioning method and an indoor positioning system for positioning a portable electronic device in an indoor environment and an indoor map establishing device thereof.

2. Description of Related Art

As wireless mobile devices gain popularity, more and more users conduct the activities in their daily life through mobile devices, and there are more and more places offering wireless network connection. Since the environment of wireless network has become more and more matured, various device manufacturers now shift focus on value-adding applications of the environment of wireless network, and one example of such applications is to provide position sensing service that offers position information. Through the position sensing service, the user can be informed with various nearby information and services and is able to quickly find his/her destination. Besides, business owners or service providers would hope to sense based on the position sensing service, so as to send information (e.g., advertisements) to the users when the users are in their business locations (e.g., malls, restaurants, parking lots, department stores, and the like). In view of the needs, it is important and necessary to provide an indoor positioning and navigating system capable of quick indoor positioning and navigating, so as to exchange the data between the business owners or service providers and the users.

Conventional commercial positioning systems, such as the Global Positioning System (GPS), are basically applicable for outdoor positioning. Such systems exhibit higher positioning accuracy and a faster positioning speed in an environment with preferable signal strength. Since satellite signals are significantly attenuated indoor, it is more challenging to use the outdoor positioning systems for indoor positioning. Currently, conventional indoor three-dimensional object positioning or tracking techniques are also under limitations such as unable to receive GPS signals, and thus adopt a user device having a wireless communication function (e.g., Bluetooth, WIFI, etc.) to transmit signals and rely on a signal strength indicator value to determine a distance with respect to a nearby object, or dispose a tag having a wireless communication function (ex. NFC tags) to an indoor object, so as to read and write relevant data through radio signals and identify a specific target by the technique of Near Field Communication. However, since these three-dimensional object positioning techniques are also based on signal reception and determination of signal strength, these techniques are also prone to the environmental influences that make the signals unstable and thus affect the accuracy of three-dimensional object positioning. Besides, the radio frequency identification function is only able to identify a specific target with a tag, and is unable to determine the distance between the user device and the object in the surrounding. In addition, the quantity of tags disposed is also subject to the budget.

It is also common to position based on a base station. For example, a positioning device (e.g., the user's mobile device) may calculate the current position by calculating the time for a signal to arrive at the base station. However, since the error of such method may be as high as hundreds of meters, such method is not suitable in the scenario of indoor positioning.

Therefore, a positioning method based on the wireless network is more suitable for an outdoor space that is more spacious, such as a stadium or an outdoor space without obstacles, and the positioning effect of such method in a space within a building, such as an indoor space or a hallway, is not as desirable. Besides, these techniques are suitable for two-dimensional positioning, and not capable of accurate three-dimensional positioning. Thus, the positioning techniques are unable to meet the needs for indoor positioning, such that currently no indoor positioning system can be used by the mass.

SUMMARY OF THE PRESENT INVENTION

The present invention provides an indoor positioning method, an indoor positioning system, and an indoor map establishing device. According to the indoor positioning method and system and the indoor map establishing device, an indoor map is quickly generated by a computer n an off-line mode and uploaded to a server end, and a portable electronic device at a user end downloads the indoor map at an on-line mode, so as to compare a real-time image captured by the portable electronic device and the indoor map to position the portable electronic device. Accordingly, the quality and efficiency of positioning service provided to the user real-time are facilitated, and the corresponding information is provided to the user more efficiently, thereby bringing more convenient operation experience to the user.

An exemplary embodiment of the present invention provides an indoor positioning method for positioning a portable electronic device. The indoor positioning method includes: converting a panorama image corresponding to an indoor environment into a plurality of perspective images, and extracting a plurality of reference feature points in the perspective images and descriptors of the reference feature points; taking a shooting position of the panorama image as an origin and recording a plurality of three-dimensional reference coordinate values corresponding to a central position of each of the perspective images; calculating three-dimensional coordinate values of the reference feature points base on the three-dimensional reference coordinate values, and storing the three-dimensional coordinate values of the reference feature points and the descriptors of the reference feature points as an indoor map corresponding to the indoor environment; and determining a three-dimensional target coordinate value of the portable electronic device in the indoor environment according to the indoor map.

According to an embodiment of the present invention, the step of taking the shooting position of the panorama image as the origin and recording the three-dimensional reference coordinate values corresponding to the central position of each of the perspective images includes: obtaining a plurality of reference pixels of the central position of each of the perspective images in a vertical axis direction and a horizontal axis direction, and recording three-dimensional coordinate values of the reference pixels as the three-dimensional reference coordinate values.

According to an exemplary embodiment of the present invention, each of the reference feature points corresponds to a feature point pixel in the perspective image, and the steps of calculating the three-dimensional coordinate values of the feature point base on the three-dimensional reference coordinate values includes: obtaining a first reference pixel corresponding to the feature point pixel in the vertical axis direction and a second reference pixel corresponding to the feature point pixel in the horizontal axis direction; and calculating a three-dimensional coordinate value of the feature point pixel based on the three-dimensional reference coordinate value of the first reference pixel and the three-dimensional reference coordinate value of the second reference pixel.

According to an exemplary embodiment of the present invention, the indoor map is generated in an off-line mode, and the off-line mode is a state without connection to the Internet.

According to an exemplary embodiment of the present invention, the indoor map is stored in a positioning database, and the step of determining the three-dimensional target coordinate value with respect to the origin of the portable electronic device in the indoor environment according to the indoor map includes: obtaining a real-time image by the portable electronic device, and extracting a plurality of target feature points of the real-time image and descriptors of the target feature points; comparing the descriptors of the reference feature points and the descriptors of the target feature points, and if the distance between the descriptors of the reference feature points and the descriptors of the target feature points smaller than a predetermined threshold value, retrieving the three-dimensional coordinate values of the reference feature points whose distance value with respect to the descriptors of the target feature points smaller than the predetermined threshold value from the positioning database; and calculating the three-dimensional target coordinate value and a rotational angle of the portable electronic device based on the three-dimensional coordinate values of the reference feature points retrieved from the positioning database.

According to an exemplary embodiment of the present invention, determining the three-dimensional target coordinate value of the portable electronic device in the indoor environment with respect to the origin is performed in an on-line mode, and the on-line mode is a state with connection to the Internet. The step before comparing the descriptors of the reference feature points and the descriptors of the target feature points further includes: determining the indoor environment of the portable electronic device through the Internet, and downloading the indoor map corresponding to the indoor environment to the portable electronic device.

An exemplary embodiment of the present invention provides an indoor positioning system. The system includes a camera device, a portable electronic device, and an indoor map establishing device. The camera device is configured to shoot a panorama image corresponding to an indoor environment, and the indoor map establishing device is connected to the camera device. The indoor map establishing device includes a storage device and a processor. The storage device stores a positioning database, and the processor is coupled to the storage device and configured to convert the panorama image into a plurality of perspective images and extract a plurality of reference feature points in the perspective images and descriptors of the reference feature points. The processor is further configured to take a shooting position of the panorama image as an origin and record a plurality of three-dimensional reference coordinate values corresponding to a central position of each of the perspective images. Moreover, the processor is further configured to calculate three-dimensional coordinate values of the reference feature points base on the three-dimensional reference coordinate values, and store an indoor map corresponding to the indoor environment and formed by the three-dimensional coordinate values of the reference feature points and the descriptors of the reference feature points in the positioning database. The portable electronic device is configured to determine a three-dimensional coordinate value of the portable electronic device in the indoor environment according to the indoor map.

According to an exemplary embodiment of the present invention, the processor is further configured to obtain a plurality of reference pixels of the central position of each of the perspective images in a vertical axis direction and a horizontal axis direction, and record three-dimensional coordinate values of the reference pixels as the three-dimensional reference coordinate values.

According to an exemplary embodiment of the present invention, each of the reference feature points corresponds to a feature point pixel in the perspective image, and the processor is further configured to obtain a first reference pixel corresponding to the feature point pixel in the vertical axis direction and a second reference pixel corresponding to the feature point pixel in the horizontal axis direction. The processor is further configured to calculate a three-dimensional coordinate value of the feature point pixel based on the three-dimensional reference coordinate value of the first reference pixel and the three-dimensional reference coordinate value of the second reference pixel.

According to an exemplary embodiment of the present invention, the portable electronic device is further configured to obtain a real-time image, and extract a plurality of target feature points of the real-time image and descriptors of the target feature points. The portable electronic device is further configured to determine the indoor environment of the portable electronic device through the Internet, and download the indoor map corresponding to the indoor environment to the portable electronic device. The portable electronic device is further configured to compare the descriptors of the reference feature points and the descriptors of the target feature points, and if the distance value between the descriptors of the reference feature points and the descriptors of the target feature points smaller than a predetermined threshold value, retrieve the three-dimensional coordinate values of the reference feature points whose distance value with respect to the descriptors of the target feature points smaller than the predetermined threshold value from the positioning database. Moreover, the portable electronic device is further configured to calculate the three-dimensional target coordinate value and a rotational angle of the portable electronic device based on the three-dimensional coordinate values of the reference feature points retrieved from the positioning database.

According to an exemplary embodiment of the present invention, the processor is operated in an off-line mode and the portable electronic device is operated in an on-line mode, and the off-line mode is a state without connection to the Internet, whereas the on-line mode is a state with connection to the Internet.

An exemplary embodiment of the present invention provides an indoor map establishing device including a storage device and a processor. The storage device stores a positioning database and a plurality of modules. The processor is coupled to the storage device, and loads and executes the modules stored in the storage device. In addition, the processor is operated in an off-line mode. The modules include an input module, an image processing module, a feature extracting module, and a computing module. The input module is configured to receive a panorama image corresponding to an indoor environment. The image processing module is configured to convert the panorama image into a plurality of perspective images. The image processing module is further configured to take a shooting position of the panorama image as an origin and record a plurality of three-dimensional reference coordinate values corresponding to a central position of each of the perspective images. The feature extracting module is configured to extract a plurality of reference feature points in the perspective images and descriptors of the reference feature points. The computing module is configured to calculate three-dimensional coordinate values of the reference feature points base on the three-dimensional reference coordinate values recorded in the image processing module, and store an indoor map corresponding to the indoor environment and formed by the three-dimensional coordinate values of the reference feature points and the descriptors of the reference feature points in the positioning database.

According to an exemplary embodiment of the present invention, the computing module is further configured to obtain a plurality of reference pixels of the central position of each of the perspective images in a vertical axis direction and a horizontal axis direction, and record three-dimensional coordinate values of the reference pixels as the three-dimensional reference coordinate values.

According to an exemplary embodiment of the present invention, each of the reference feature points corresponds to a feature point pixel in the perspective image, and the computing module is further configured to obtain a first reference pixel corresponding to the feature point pixel in the vertical axis direction and a second reference pixel corresponding to the feature point pixel in the horizontal axis direction. The computing module is further configured to calculate a three-dimensional coordinate value of the feature point pixel based on the three-dimensional reference coordinate value of the first reference pixel and the three-dimensional reference coordinate value of the second reference pixel.

According to an exemplary embodiment of the present invention, the off-line mode is a state without connection to the Internet.

Based on the above, in the exemplary embodiments, the technical solution of recording only the three-dimensional reference coordinate values of the reference pixels of the central positions of the perspective views obtained by unfolding the panorama image in the vertical axis direction and the horizontal axis direction in the off-line mode is adopted, so as to effectively save the memory space of the storage device and facilitate the performance of obtaining the three-dimensional coordinate of each feature point in the perspective image, thereby quickly generating the indoor map. Accordingly, in the on-line mode, the portable electronic device may quickly compare the real-time image captured by the portable electronic device itself and the indoor map, so as to position the portable electronic device of the user.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1:
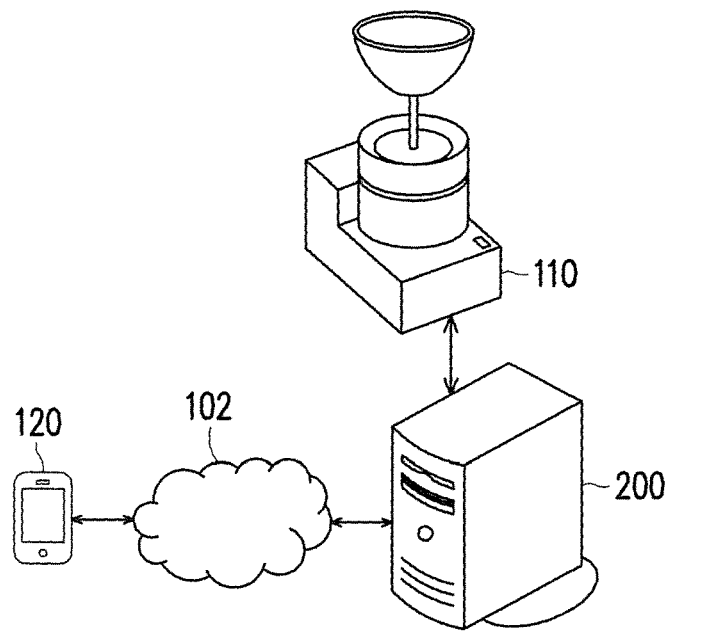
FIG. 1 is a schematic view illustrating an indoor positioning system according to an embodiment of the invention.

Reference will now be made in detail to the present preferred embodiments of the present invention, examples of which are illustrated in the accompanying drawings. Wherever possible, the same reference numbers are used in the drawings and the description to refer to the same or like parts.

To allow the user to quickly and conveniently find his/her destination or target in an indoor environment, and provide a function for business owners to exchange data with the user through positioning and navigating functions in the indoor environment, the embodiments of the present invention establish an indoor map based on a 360-degree panorama image obtained in an off-line analysis, and compare an image captured by the user's portable electronic device and the indoor map based on an image identification technique, so as to position the user's portable electronic device. Therefore, positioning of the portable electronic device is not limited by unstable signals and incorrect positioning caused by a wireless network and an obstacle in the space. Accordingly, the quality and efficiency of the positioning service offered to the user real-time are effectively facilitated.

FIG. 1 is a schematic view illustrating an indoor positioning system according to an embodiment of the invention. Referring to FIG. 1, an indoor positioning system 100 includes an indoor map establishing device 200, a camera device 110, and a portable electronic device 120. The camera device 100 is a catadioptric camera formed by a convex lens and a single-lens camera, for example. However, the present invention is not limited thereto. For example, the camera device 110 may also be other omni-directional cameras capable of taking a 360-degree panorama image. The portable device 120 may be a mobile device, a personal digital assistant (PDA), a tablet computer, or the like. Alternatively, the portable device 120 may also be other electronic devices connected to the Internet 102 through a wireless communication network and communicating and transmitting data with the indoor map establishing device 200. In addition, the Internet 102 is a Wireless Fidelity (WiFi) network or a global system for mobile (GSM) network, for example. However, it should be understood that the Internet 102 may also be other suitable network communication protocols, and the present invention does not intend to impose a limitation in this regard.

For example, the indoor map establishing device 200 is operated in an off-line mode, and the indoor map establishing device 200 may receive a panorama image from the camera device 110 and establish an indoor map based on the panorama image. The portable electronic device 120 is operated in an on-line mode, so as to download the indoor map from the indoor map establishing device 200 through the Internet 102 for a positioning operation of the portable electronic device 120. Here, the off-line mode refers to a state without connection to the Internet, while the on-line mode refers to a state with connection to the Internet 102. It should be understood that, while the example here is described based on a portable electronic device, the present invention is not limited thereto. For example, the indoor positioning system 100 may include a plurality of portable electronic devices, and each portable electronic device may perform positioning calculation to obtain a three-dimensional coordinate value of the portable electronic device in the indoor environment.

Figure 2:
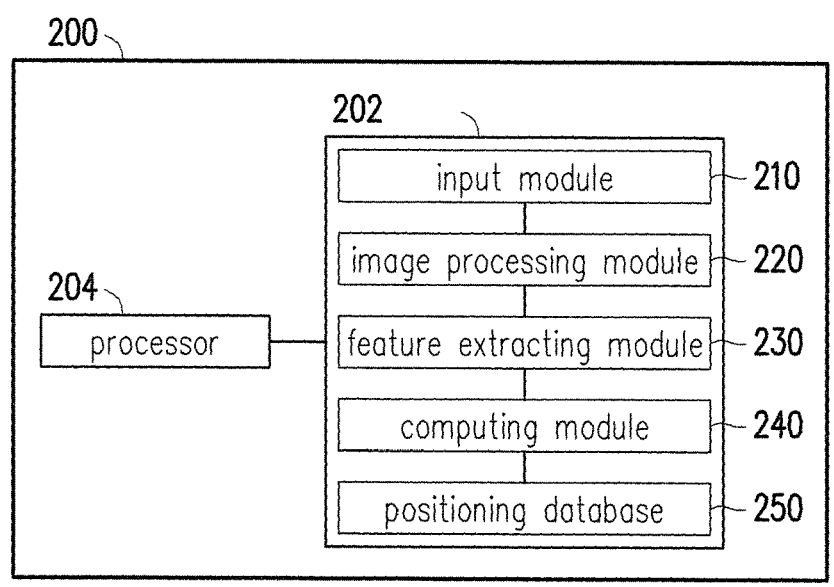
FIG. 2 is a block view illustrating an indoor map establishing device according to an embodiment of the invention.

FIG. 2 is a block view illustrating an indoor map establishing device according to an embodiment of the invention. Referring to FIG. 2, the indoor map establishing device 200 includes a storage device 202 and a processor 204. In the embodiment, the indoor map establishing device 200 may be a server or a computer system having a computing capability.

The storage device 202 may be any type of static or portable random access memory (RAM), read-only memory (ROM), flash memory, solid state drive (SSD), similar components, or a combination thereof. In the embodiment, the storage device 202 is configured to store software programs such as an input module 210, an image processing module 220, a feature extracting module 230, a computing module 240, and a positioning database 250, etc.

The processor 204 is coupled to the storage device 202. The processor 204 may be a single-core or multi-core central processing unit (CPU), other programmable general-purpose or specific-purpose microprocessors, a digital signal processor (DSP), a programmable controller, an application specific integrated circuit (ASIC), other similar components, or a combination thereof In the exemplary embodiment, the processor 204 is configured to access and execute the input module 210, the image processing module 220, the feature extracting module 230, the computing module 240, and the positioning database 250 recorded in the storage device 202, so as to carry out the indoor positioning method according to the embodiments of the present invention. To more clearly describe the operation of the indoor positioning system 100 of the embodiments of the present invention and the indoor map establishing device 200 and the portable electronic device 120 of the indoor positioning system 100, an example is described in the following with reference to FIGS. 1, 2, and 3.

Figure 3:
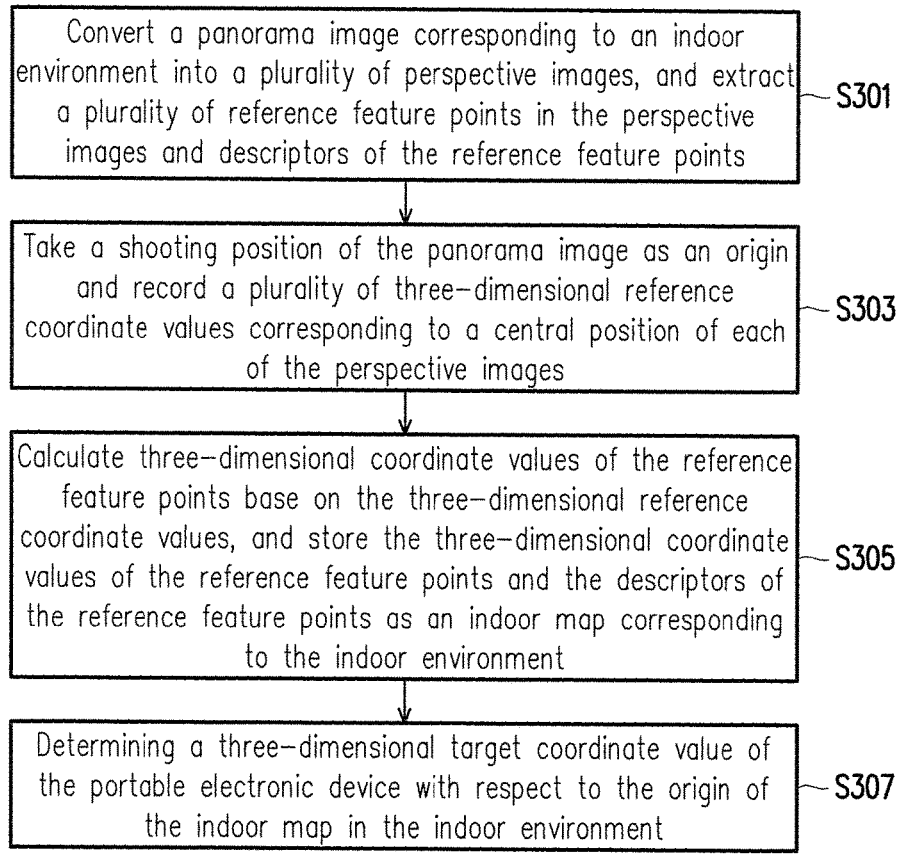
FIG. 3 is a flowchart illustrating an indoor positioning method according to an embodiment of the invention.

FIG. 3 is a flowchart illustrating an indoor positioning method according to an embodiment of the invention. Referring to FIGS. 1 to 3, the input module 210 of the indoor map establishing device 200 may receive a panorama image from the camera device 110, and in Step 301, the image processing module 220 may convert the panorama image received from the input module 210 into a plurality of perspective images, and the feature extracting module 230 may extract a plurality of feature points (also referred to as reference feature points) in the perspective images and descriptors of the reference feature points.

Specifically, panorama images may be classified into spherical panorama images, cylindrical panorama images, and cubic panorama images. In the exemplary embodiment, the panorama image taken by the camera device 110 is a cylindrical panorama image. Since the cylindrical panorama image may be unfolded into perspective images with only left and right boundaries distorted, adopting the cylindrical panorama image retains original states of most feature points in the image.

In the exemplary embodiment of the present invention, a target feature point of a real-time image captured by the user's portable electronic device 120 and the reference feature point of the panorama image after being converted into the perspective images are compared, and the portable electronic device 120 is positioned based on the three-dimensional coordinates of the feature points found matched in the comparison. Since the real-time image captured by the portable electronic device 120 adopts the Cartesian Coordinate System, whereas the cylindrical panorama image adopts the Cylindrical Coordinate System, when the two images are compared, the numbers and positions of the feature points resulting from calculation may not completely match, thus rendering an inaccurate comparison result. Besides, a panorama image is unable to be directly converted into a complete image under the Cartesian Coordinate System. Thus, in Step S301, the image processing module 220 may convert the received panorama image into the perspective images.

FIGS. 4A to 4D are schematic view illustrating converting a panorama image into a plurality of perspective images according to an embodiment of the present invention.

Figure 4A:
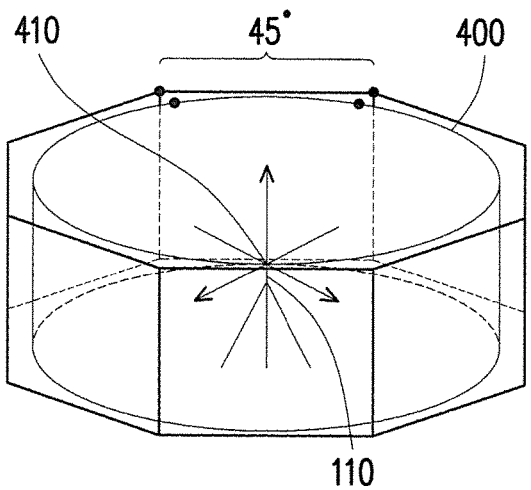
FIGS. 4A to 4D are schematic view illustrating converting a panorama image into a plurality of perspective images according to an embodiment of the invention.
Figure 4B:
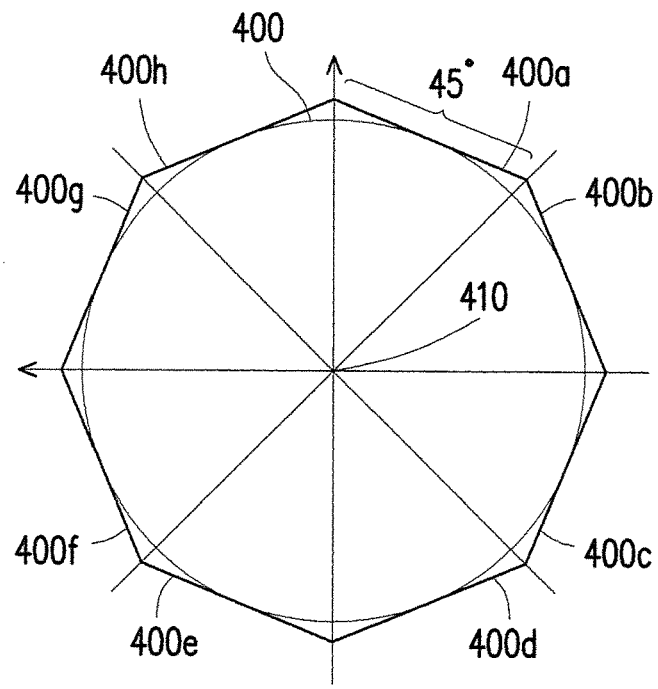

Referring to FIGS. 4A to 4D, a center point of a panorama image 400 taken by the camera device 110 is at a shooting position where the camera device 110 is located. In other words, as shown in FIG. 4A, the shooting position of the camera device 110 is an origin 410 of the panorama image 400. In the exemplary embodiment, as shown in FIG. 4B, the image processing module 220 may divide the panorama image 400 into eight strip perspective images 400a to 400h with the same width, and each strip perspective image may cover a horizontal field-of-view of 45° from the origin 410 of the cylindrical panorama image 400. It should be noted that the exemplary embodiment adopts the horizontal field-of-view of 45° as a standard for division because the field-of-view of the mobile devices (e.g., smart phones) on the market is about 45°. However, such standard for division shall not be construed as a limitation on the standard for division concerning the size of the horizontal field-of-view.

For example, in another exemplary embodiment, the standard for division may also be set as a horizontal field-of-view greater or smaller than 45° based on practical needs.

Figure 4C:
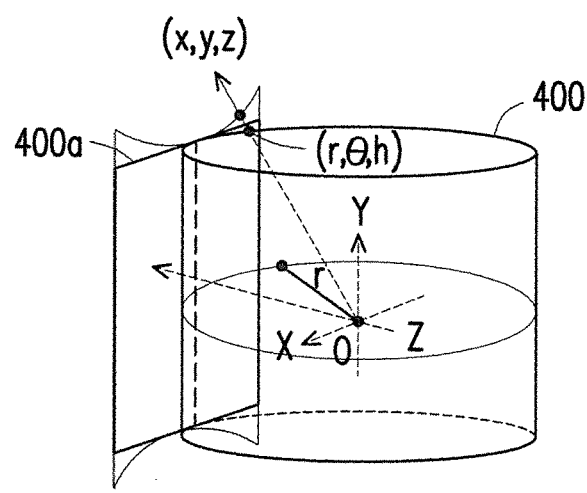

Since the real-time image captured by the portable electronic device 120 adopts the Cartesian Coordinate System, and the cylindrical panorama image adopts the Cylindrical Coordinate System, the unfolding of the cylindrical panorama image 400 into the perspective views involves conversion between the two coordinate systems. As shown in FIG. 4C, taking the perspective image 400a as an example, the perspective image 400a after being converted into the Cartesian Coordinate System may exhibit concave regions at a top part and a bottom part, making the left and right boundaries of the perspective image 400a distorted. For example, the perspective image 400a may exhibit strip-like lines (not shown) formed by pixels without being filled with a gray-scale color. Such phenomenon is referred to as an aliasing effect. In view of the issue, in the exemplary embodiment of the present invention, the image processing module 220 may perform image processing on the perspective image 400a to assign an average value of adjacent left and right pixels to the strip-like lines formed by the pixels without being filled with a gray-scale color.

Figure 4D:
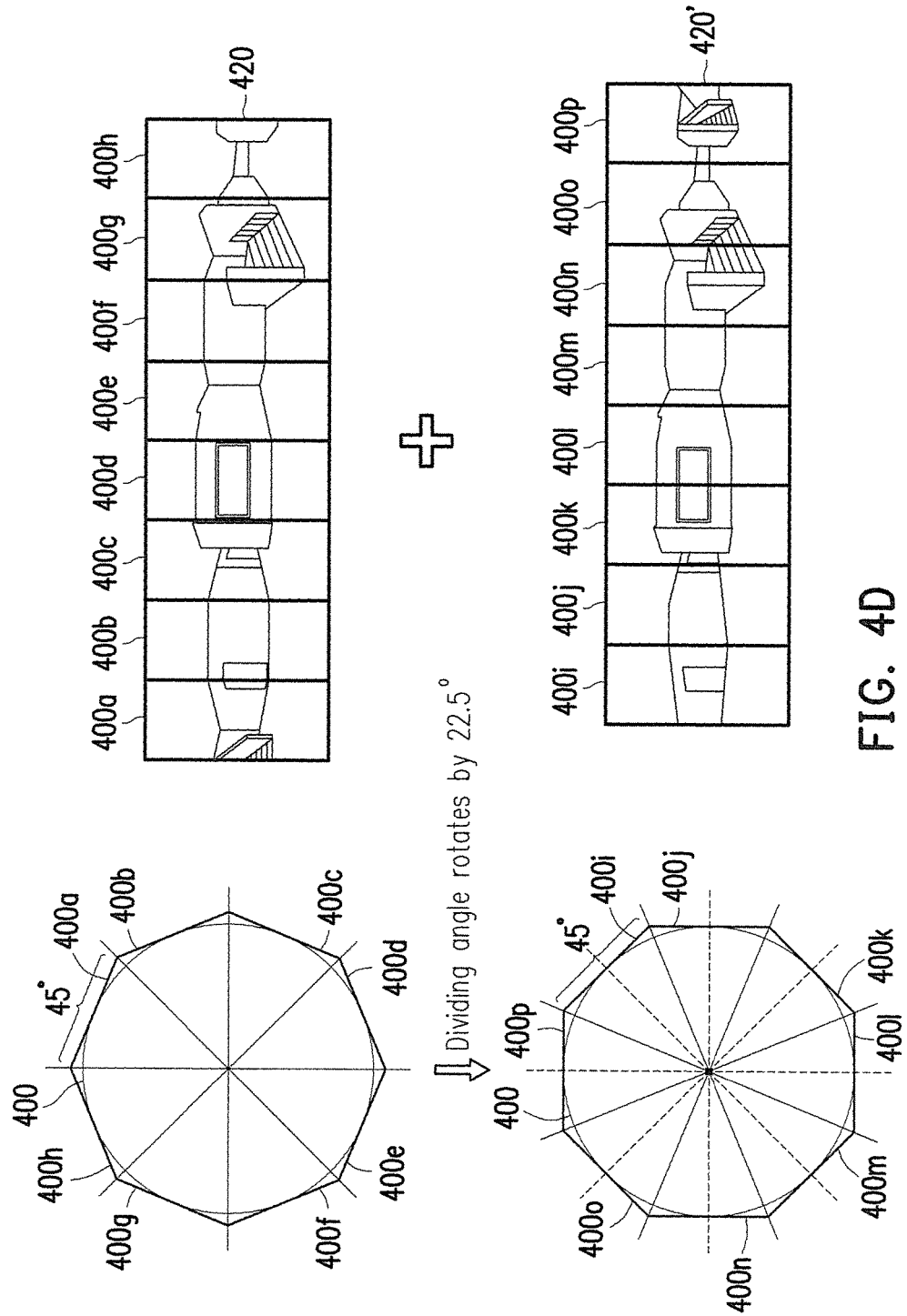

Particularly, in the exemplary embodiment of the present invention, the image processing module 220 may generate unfolded perspective image 420 and unfolded perspective image 420' (as shown in FIG. 4D) corresponding the panorama image 400 during the operation of converting the panorama image 400 into the perspective images.

The unfolded perspective image 420 is obtained by unfolding the perspective images 400a to 400h divided based on the dividing angle shown in FIG. 4B, and the unfolded perspective image 420' is obtained by unfolding perspective images 400i to 400p divided based on a dividing angle differing from the dividing angle shown in FIG. 4B by 22.5°. With the two unfolded perspective images (i.e., the unfolded perspective image 420 and the unfolded perspective image 420'), the inaccurate comparison result due to the deformation in curvature in the left and right boundaries of each perspective image is able to be remedied, and the subsequent computation on the feature points in the perspective views can be more accurate. Taking the perspective image 400b as an example, the inaccurate comparison result due to the deformation in curvature of the left and right boundaries of the perspective image 400b may be compensated by the reference feature points generated in the perspective image 400i and the perspective image 400j.

Besides, in Step S301, the operation performed by the feature extracting module 230 to extract the reference feature points in the perspective images 400a to 400h and the descriptors of the feature points may adopt an algorithm using a two-bit string as a descriptor vector, such as Binary Robust Independent Elementary Features (BRIEF), Oriented FAST and Rotated BRIEF (ORB), or Binary Robust Invariant Scalable Keypoints (BRISK), etc., for feature extracting. Specifically, the BRIEF algorithm chooses some pixel pairs within a nearby range of the feature point, and compares gay scale values of these pixel pairs to form a two-bit string by combining comparison results, so as to describe the feature point. In addition, the Hamming Distance is adopted to calculate whether the feature descriptors are matched. In view that the feature point obtained by the BRIEF algorithm lacks rotation invariance and scale invariance, and is sensitive to noise, the ORB algorithm improves by performing Gaussian blur on the image and generating a scale space so that the feature point exhibits scale invariance. Then, a moment vector computation is performed on the feature point so that the feature point exhibits direction invariance. Subsequently, a BRIEF feature description is performed on the feature point, so that the feature point obtained accordingly exhibits rotation invariance and scale invariance, and is less prone to noise interference. Similarly, the BRISK algorithm also improves based on the BRIEF algorithm. The feature point of the BRISK algorithm exhibits scale invariance and rotation invariance.

Then, in Step S303, the image processing module 220 may take the shooting position of the panorama image 400 as the origin 410 and record a plurality of three-dimensional coordinate values (also referred to as three-dimensional reference coordinate values) at a central position of each of the perspective images 400a to 400h. In other words, the three-dimensional reference coordinate values recorded by the image processing module 220 are relative coordinate positions with respect to the three-dimensional coordinate value of the origin 410. Here, the three-dimensional reference coordinate values corresponding to the central position of each of the perspective images 400a to 400h refer to coordinate values corresponding to a plurality of pixels (also referred to as a plurality of reference pixels) of the central position of each of the perspective images 400a to 400h in a vertical axis direction and a horizontal axis direction.

Figure 5:
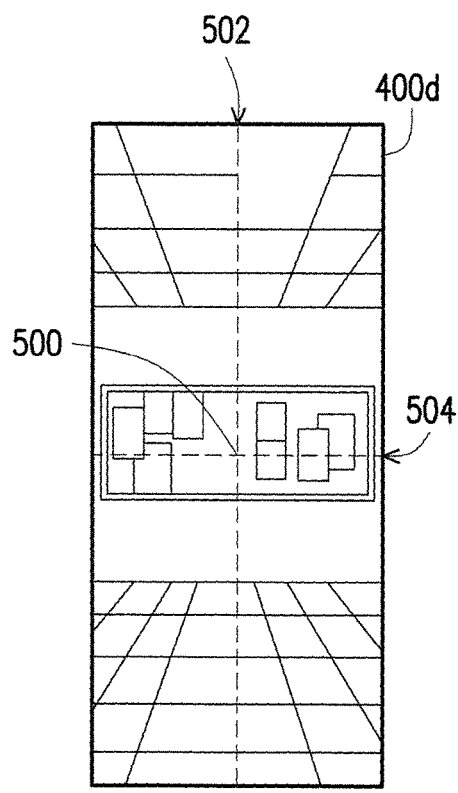
FIG. 5 is a schematic view illustrating recording a plurality of three-dimensional reference coordinate values corresponding to central positions of the perspective images according to an embodiment of the invention.

FIG. 5 is a schematic view illustrating recording a plurality of three-dimensional reference coordinate values corresponding to central positions of the perspective images according to an embodiment of the invention.

Referring to FIG. 5, in the exemplary embodiment, taking the perspective image 400d obtained by unfolding the panorama image 400 as an example, the image processing module 220 may obtain a plurality of reference pixels of a central position 500 of the perspective image 400d in a vertical axis direction 502 and a horizontal axis direction 504, and only record three-dimensional reference coordinate values of the reference pixels. Similarly, the image processing module 220 records only three-dimensional reference coordinate values of a plurality of reference pixels of the central position 500 of each of the remaining perspective images (i.e., the perspective images 400a to 400c and 400e to 400h) in the vertical axis direction 502 and the horizontal axis direction 504. Since the image processing module 220 does not need to record three-dimensional coordinate values of all the pixels of each of the perspective images, a memory space of the storage device 202 is able to be effectively saved.

In particular, during unfolding of the cylindrical panorama image 400 into the perspective images 400a to 400h, the three-dimensional reference coordinate values of the reference pixels in the vertical axis direction 502 are substantially unchanged during the operation of converting between the coordinate systems. As for the reference pixels on the horizontal axis 504, only the reference pixels near the edges are slightly deformed during the operation of conversion between the coordinate systems. In other words, the reference pixels at the central position 500 of each of the perspective images in the vertical axis direction 502 and the horizontal axis direction 504 may be considered as pixels without deformation in curvature. Therefore, the computing module 240 may infer the three-dimensional coordinate values of the reference feature points of the perspective images extracted by the feature extracting module 230 through linear interpolation based on the three-dimensional coordinate values of the pixels without deformation in curvature. For example, in Step S305, the computing module 240 may calculate the three-dimensional coordinate values of the reference feature points with respect to the origin 410 based on the three-dimensional reference coordinate values, and store an indoor map corresponding to the indoor environment and formed by three-dimensional coordinate values of the reference feature points and the descriptors of the reference feature points in the positioning database 250. Here, the indoor map of the exemplary embodiment of the present invention is formed by the feature points having the three-dimensional coordinate values and the descriptors of the feature points. The three-dimensional coordinate values of the feature points are relative coordinate positions with respect to the three-dimensional coordinate value of the origin 410.

Figure 6:
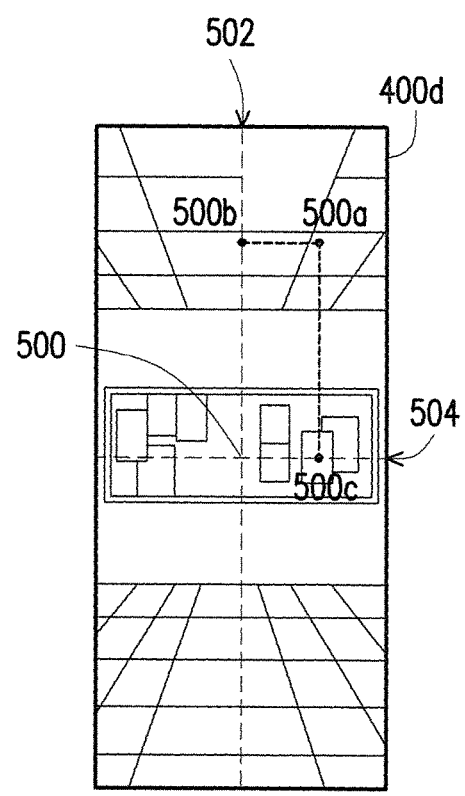
FIG. 6 is a schematic view illustrating calculating three-dimensional coordinate values of feature points according to the three-dimensional reference coordinate values corresponding to the central positions in the perspective images according to an embodiment of the invention.

FIG. 6 is a schematic view illustrating calculating three-dimensional coordinate values of feature points according to the three-dimensional reference coordinate values corresponding to the central positions in the perspective images according to an embodiment of the invention.

Specifically, each reference feature point extracted by the feature extracting module 230 from the perspective image belongs to a pixel in the perspective image. Namely, each reference feature point corresponds to one (also referred to as feature point pixel) of the pixels in the perspective image. Here, the perspective image 400d obtained by unfolding the panorama image 400 is used as an example again to describe how the three-dimensional coordinate value of the feature point is obtained. Referring to FIG. 6, assuming that a feature point pixel 500a in the perspective image 400d is a feature point extracted by the feature extracting module 230, the computing module 240 may obtain a reference pixel 500b (also referred to as first reference pixel 500b) corresponding to the feature point pixel 500a in the vertical axis direction 502 and a reference pixel 500c (also referred to as second reference pixel 500c) corresponding to the feature point pixel 500a in the horizontal axis direction 504, and the three-dimensional reference coordinate value of the first reference pixel 500b and the three-dimensional reference coordinate value of the second reference pixel 500c are recorded by the image processing module 220 in Step S303. Accordingly, the computing module 240 is able to quickly calculate a three-dimensional coordinate value of the feature point pixel 500a based on the three-dimensional reference coordinate value of the first reference pixel 500b and the three-dimensional reference coordinate value of the second reference pixel 500c.

Figure 7A:
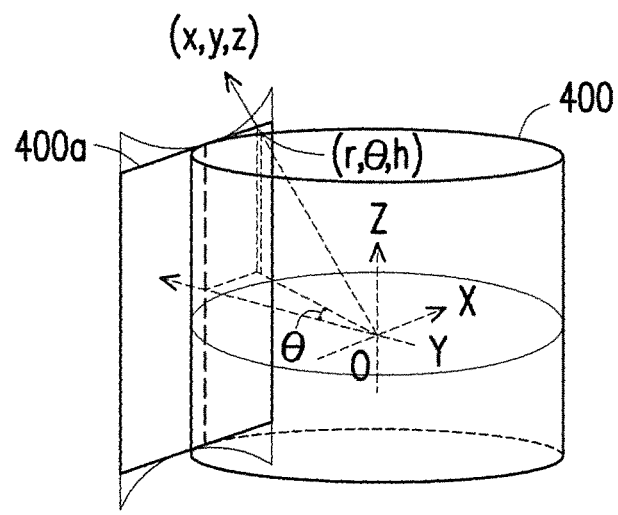
FIG. 7A is a schematic view illustrating a corresponding relation between the Cylindrical Coordinate System and the Cartesian Coordinate System according to an embodiment of the invention.
Figure 7B:
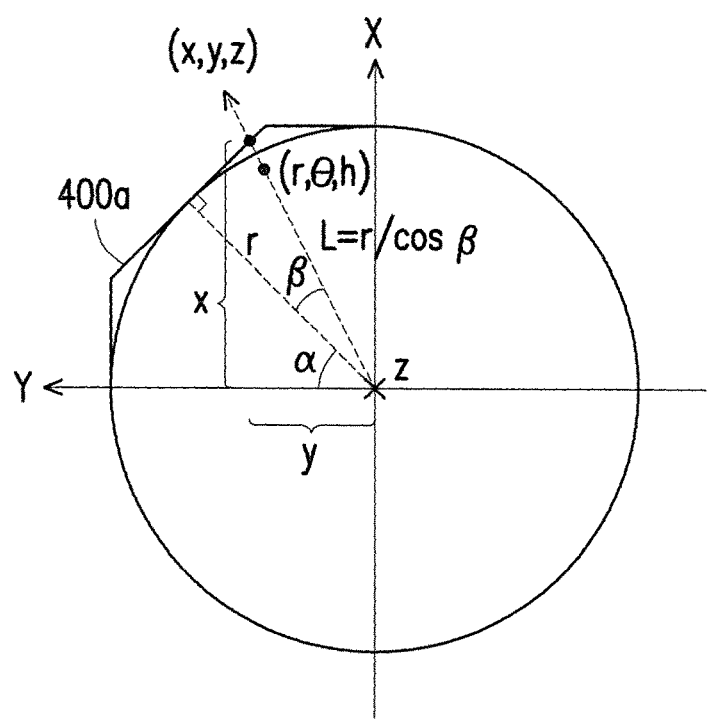
FIG. 7B is a top view illustrating a panorama image according to an embodiment of the invention.
Figure 7C:
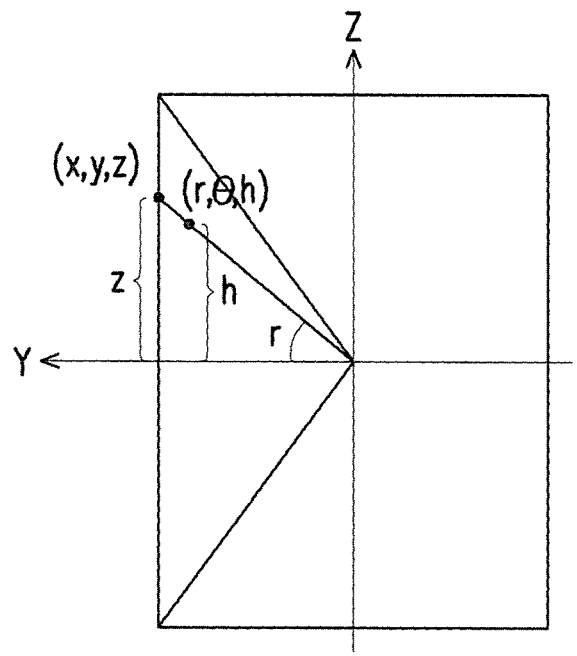
FIG. 7C is a side view illustrating a panorama image according to an embodiment of the invention.
Figure 7D:
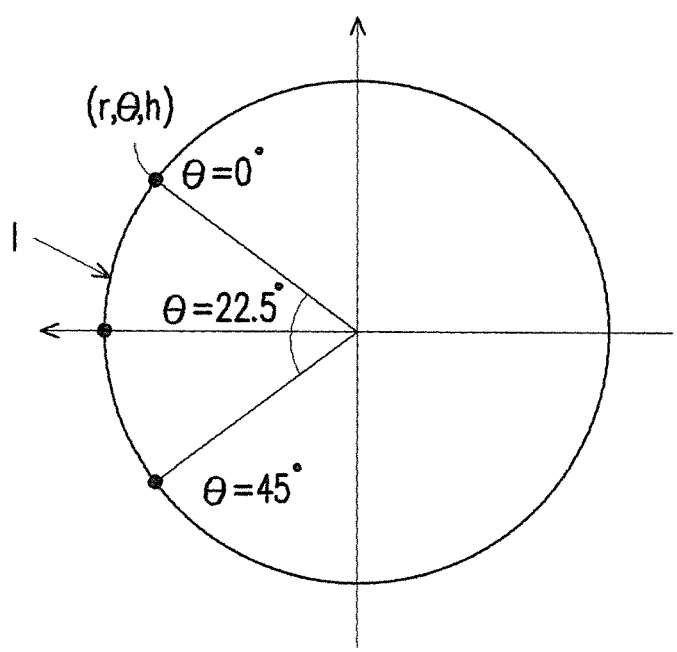
FIG. 7D is a schematic view illustrating symmetry of a cylindrical coordinate system according to an embodiment of the invention.

FIG. 7A is a schematic view illustrating a corresponding relation between the Cylindrical Coordinate System and the Cartesian Coordinate System according to an embodiment of the invention. FIG. 7B is a top view illustrating a panorama according to an embodiment of the invention. FIG. 7C is a side view illustrating a panorama according to an embodiment of the invention. FIG. 7D is a schematic view illustrating symmetry of a cylindrical coordinate system according to an embodiment of the invention.

Referring to FIGS. 7A to 7C, FIG. 7A illustrates a corresponding relation between the Cylindrical Coordinate System and the Cartesian Coordinate System of the panorama image 400 of the exemplary embodiment, and FIGS. 7B and 7C are respectively a top view and a side view of the panorama image 400. Here, the panorama image 400a obtained by unfolding the panorama image 400 is used as an example. Also, a cylindrical coordinate $(r, \theta, h)$ on the panorama image 400 corresponds to a three-dimensional coordinate $(x, y, z)$ of the Cartesian Coordinate System of the perspective image 400a obtained by unfolding the panorama image 400. In Step S303 in the exemplary embodiment of the present invention, the three-dimensional reference coordinate values of each of the perspective images 400a to 400h recorded by the image processing module 220 are obtained based on Formula (1) to Formula (3) below.

$$x = \frac{r \cdot \sin(22.5 * n + \beta)}{\cos\beta} \quad \text{Formula (1')}$$

for the perspective images 400a to 400h $$x = \frac{r \cdot \sin(45 * n + \beta)}{\cos\beta} \quad \text{Formula (1'')}$$

for the perspective images 400i to 400p $$y = \frac{r \cdot \cos(22.5 * n + \beta)}{\cos\beta} \quad \text{Formula (2')}$$

for the perspective images 400a to 400h $$y = \frac{r \cdot \cos(45 * n + \beta)}{\cos\beta} \quad \text{Formula (2'')}$$

for the perspective images 400i to 400p $$z = \frac{h * \left| \sqrt{x^2 + y^2} \right|}{r} \quad \text{Formula (3)}$$

With reference to FIGS. 7A to 7D, detailed descriptions will be made in the following on how Formula (1) to Formula (3) are derived in the present invention.

Referring to FIGS. 7A to 7D, a circumference of the cylindrical panorama image 400 is equal to a width of the panorama image 400, and the formula for circumference is $c=2\pi \cdot r$, wherein c represents the circumference of the cylindrical panorama image 400. Thus, a radiation distance r of the cylindrical coordinate $(r, \theta, h)$ may be represented by Formula (4) in the following.

$$r=c/2\pi \quad \text{Formula (4)}$$

Then, in the exemplary embodiment of the present invention, it is assumed that an arc length of an azimuth angle $\theta$ in the Cylindrical Coordinate System is l, and the formula for arc length is $l=r \cdot \theta$. Thus, the azimuth angle $\theta$ of the Cylindrical Coordinate System may be represented by Formula (5) in the following.

$$\theta=l/r \quad \text{Formula (5)}$$

In particular, due to the symmetrical property of a cylinder, a value of $\theta$ may range between $-22.5°$ and $22.5°$, i.e., $-22.5°<\theta<22.5°$. In the exemplary embodiment, the horizontal field-of-view of 45° is adopted as the standard for division to divide the panorama image 400 into eight strip perspective images 400a to 400h with equal width. Therefore, the angle covered by 22.5° is a half of each of the strip perspective images.

Then, by taking Formulae (4) and (5) into consideration and calculating a linear proportional relation based on the standard trigonometric function, calculation may be made with Formulae (1) to (3) to obtain the Cartesian coordinate (x, y, z) corresponded to the cylindrical coordinate (r, θ, h) of the panorama image 400. Specifically, in the exemplary embodiment, when converting the panorama image 400 into the perspective image 400*a*, the image processing module 220 may sequentially scan pixels on the panorama image 400 corresponding to the perspective image 400*a*, so as to perform coordinate conversion on these pixels. A scanning order of the image processing module 220 is from left to right and from top to bottom. Since the scanning order is from left to right and from top to bottom, the Cartesian coordinate (x, y, z) is calculated in an order of x, y, and z.

Referring to FIG. 7B again, L in FIG. 7B is a distance from the origin of the coordinate system to the perspective image 400*a* when the image processing module 220 scans the perspective image 400*a* to an angle β. Since $$\cos\beta = \frac{r}{L}, L = \frac{r}{\cos\beta}.$$

Then, Formula (6) for x as follows can be derived based on the trigonometric function.

$$x = L \cdot \sin(\alpha + \beta) = \frac{r \cdot \sin(\alpha + \beta)}{\cos\beta} \quad \text{Formula (6)}$$

Besides, in the exemplary embodiment, an included angle of the respective perspective images 400*a* to 400*h* is 45°, namely α=22.5°. Therefore, Formula (6) may be rewritten into $$x = \frac{r \cdot \sin(22.5 \ast n + \beta)}{\cos\beta}$$

for the perspective images 400*a* to 400*h*, thereby obtaining Formula (1'). It should be noted that n in Formula (1) refers to the n$^{th}$ perspective image. For example, in the exemplary embodiment, the image processing module 220 divides the panorama image 400 into eight strip perspective images 400*a* to 400*h* with the same width. In other words, the 0$^{th}$ perspective image is the perspective image 400*a*, the first perspective image is the perspective image 400*b*. Following the same principle, the second to seventh perspective images are respectively the perspective images 400*c* to 400*h*. Namely, in the exemplary embodiment, n=0, 1, 2, 3, 4, 5, 6, 7.

Similarly, the perspective images 400*i* to 400*p* are shift 22.5°, thus, Formula (6) may be rewritten into $$x = \frac{r \cdot \sin(45 \ast n + \beta)}{\cos\beta}$$

for the perspective images 400*i* to 400*p*, thereby obtaining Formula (1").

Following the same principle, a formula for $$y = \frac{r \cdot \cos(22.5 \ast n + \beta)}{\cos\beta}$$

for the perspective images 400*a* to 400*h*, i.e., Formula (2'), can be derived based on the trigonometric function.

Following the same principle, a formula for $$y = \frac{r \cdot \cos(45 \ast n + \beta)}{\cos\beta}$$

for the perspective images 400*i* to 400*p*, i.e., Formula (2"), can be derived based on the trigonometric function.

Finally, referring to FIG. 7C, based on a linear proportional relation between z and h, Formula (3) for z can be derived. Since $$\frac{z}{h} = \frac{L}{r}, \frac{z}{h} = \frac{|\sqrt{x^2+y^2}|}{r} \Rightarrow z = \frac{h \ast |\sqrt{x^2+y^2}|}{r},$$

so Formula (3) is derived.

It should be noted that, in Steps S301 to S305, the indoor map establishing device 200 generates the indoor map in the off-line mode, and the indoor map is stored in the positioning database 250. Accordingly, positioning calculation of the portable electronic device 120 may be achieved by the portable electronic device 120 itself. Specifically, referring to FIG. 3 again, in Step S307, the portable electronic device may determine a three-dimensional coordinate value (also referred to as three-dimensional target coordinate value) of the portable electronic device 120 with respect to the origin 410 in the indoor environment based on the indoor map generated in Step S301 to S305. In other words, a pose of the portable electronic device 120 (i.e., the three-dimensional coordinate value and rotational angle of the portable electronic device 120) does not need to be calculated by the indoor map establishing device 200 at a server end. Besides, the indoor map establishing device 200 in the exemplary embodiment of the present invention generates the indoor map based on the 360-degree panorama image obtained through an off-line analysis. Accordingly, compared with conventional techniques, such as laser reflection, point cloud technology, signal strength indicator, Global Positioning System (GPS), requiring the Internet to establish an indoor/outdoor map, the present invention not only saves computing resources for generating the indoor map, but also increases the accuracy of the indoor map.

In the exemplary embodiment, the portable electronic device 120 is operated in the on-line mode. Therefore, the portable electronic device 120 may constantly obtain the current real-time image, and extract a plurality of feature points (also referred to target feature points) in the real-time image and descriptors of the target feature points. It should be noted that, for ease of description, the feature points extracted from the perspective views 400*a* to 400*h* obtained by unfolding the panorama image 400 by the indoor map establishing device 200 in the exemplary embodiment of the present invention are all referred to as the reference feature points, whereas the feature points extracted by the portable electronic device 120 from the real-time image are all referred to as the target feature points.

Specifically, when the user holds his/her portable electronic device 120 and intends to enter a specific indoor environment (e.g., a convenient store), the portable electronic device 120 may determine the indoor environment where the portable electronic device 120 is located through the Internet 102, and download the indoor map corresponding to the indoor environment from the indoor map establishing device 200 to the portable electronic device 120. For example, the portable electronic device 120 may learn which convenience store the user currently intends to enter via GPS, so as to download an indoor map of the convenience store from the positioning database 250 of the indoor map establishing device 200 at the server end to the portable electronic device 120 at the user end.

Then, the portable electronic device 120 may compare the descriptors of the reference feature points and the descriptors of the target feature points, and when a distance value between the descriptors of the reference feature points and the descriptors of the target feature points smaller than a predetermined threshold value, the portable electronic device 120 may retrieve the three-dimensional coordinate values of the reference feature points whose distance value with respect to the descriptors of the target feature points smaller than the predetermined threshold value from the positioning database 250. For example, by utilizing a characteristic of the BRISK algorithm of sampling by surrounding the feature point with a circular annulus structure, the descriptors of the feature points are able to be calculated based on a gray-scale difference between two sampling points. Besides, a comparison value of sampling points in the innermost circle has a decisive influence on the similarity between two feature descriptors. Namely, the identifiability corresponding to the sampling point comparison values from the innermost circle to the outermost circle vary from high to low, and bit values corresponding to the sampling point comparison values from the innermost circle to the outermost circle are sequentially recorded in the descriptors.

Accordingly, the comparison between the descriptor of the reference feature points and the descriptors of the target feature points determines the similarity between the descriptors based on the Hamming distance. More specifically, in the exemplary embodiment, the portable electronic device 120 sequentially calculates the Hamming distance between the descriptors of the reference feature points and the descriptors of the target feature points from the inner circle to the outer circle. For example, the portable electronic device 120 proceeds to calculate the similarity between the descriptors of the next circle (i.e., the next outer circle of the current circle) only when determining that the Hamming distance of a byte of the current circle of the descriptors is lower than the predetermined threshold value. For example, when the distance value (i.e., Hamming distance) between the byte value of each circle of the descriptors of the reference feature points and the byte value of each circle of the descriptors of the target feature points smaller than the threshold value, the portable electronic device 120 may retrieve the three-dimensional coordinate values of the reference feature points whose distance value with respect to the descriptors of the target feature points smaller than the threshold value from the positioning database 250. Alternatively, the portable electronic device 120 may determine that the descriptors are not similar and stop the computation on determining the similarity between the descriptors.

Then, the portable electronic device 120 may calculate the three-dimensional target coordinate value and the rotational angle of the portable electronic device 120 by using the three-dimensional coordinate values of the reference feature points retrieved from the positioning database 250. For example, in the exemplary embodiment of the present invention, the portable electronic device 120 may substitute the three-dimensional coordinate values of the reference feature points whose Hamming distance with respect to the descriptors of the target feature points smaller than the predetermined threshold value into the EPnP formula, and filter out erroneous three-dimensional coordinate values based on the Ransac algorithm, so as to obtain the three-dimensional target coordinate value and the rotational angle of the portable electronic device 120.

Based on the above, the exemplary embodiment of the present invention may be divided into an operation where the indoor map establishing device 200 generates the indoor map in the off-line mode (also referred to first stage) and a positioning operation performed by the portable electronic device 120 in the on-line mode (also referred to a second stage). It should be noted that, the technical solution of only recording the three-dimensional reference coordinate values of the reference pixels of the central positions of the perspective images in the vertical axis direction and the horizontal axis direction at the first stage not only saves the memory storage of the storage device effectively, but also quickly obtains the three-dimensional coordinate of each feature point in the perspective images from the reference coordinate values, so as to record the indoor map formed by the three-dimensional coordinates of the feature points in the positioning database. Besides, by storing the indoor maps corresponding to different indoor environments at the first stage, the portable electronic device may download only the indoor map corresponding to the current indoor environment for comparison with the real-time image captured by the portable electronic device at the second stage. Particularly, at the second stage, the portable electronic device may compare the descriptors between the indoor map and the real-time image based on the properties of the descriptors of the feature points, so as to quickly filter out the descriptors not matching and thereby efficiently and accurately determine the pose of the portable electronic device (i.e., the three-dimensional coordinate value and rotational angle of the portable electronic device 120).

In view of the foregoing, the indoor positioning method, the indoor positioning system, and the indoor map establishing device according to the embodiments of the present invention are capable of analyzing the obtained 360-degree panorama image and quickly generating the indoor map in the off-line mode. Thus, the portable electronic device may compare the real-time image captured by the portable electronic device itself with the indoor map in the on-line mode to position the portable electronic device of the user. Besides, the portable electronic device in the embodiments of the present invention is able to quickly filter out the descriptors indicating non-matching between the indoor map and the real-time image, so as to quickly determine the pose of the portable electronic device. Therefore, the portable electronic device is able to efficiently provide corresponding information to the user to bring more convenient operation experience to the user.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. An indoor positioning method, configured to position a portable electronic device, the indoor positioning method comprising:

converting a panorama image corresponding to an indoor environment into a plurality of perspective images, and extracting a plurality of reference feature points in the perspective images and descriptors of the reference feature points;

taking a shooting position of the panorama image as an origin and recording a plurality of three-dimensional reference coordinate values corresponding to a central position of each of the perspective images;

calculating three-dimensional coordinate values of the reference feature points base on the three-dimensional reference coordinate values, and storing the three-dimensional coordinate values of the reference feature points and the descriptors of the reference feature points as an indoor map corresponding to the indoor environment; and determining a three-dimensional target coordinate value of the portable electronic device with respect to the origin of the indoor map in the indoor environment.

2. The indoor positioning method as claimed in claim 1, wherein the step of taking the shooting position of the panorama image as the origin and recording the three-dimensional reference coordinate values corresponding to the central position of each of the perspective images comprises:

obtaining a plurality of reference pixels of the central position of each of the perspective images in a vertical axis direction and a horizontal axis direction, and recording three-dimensional coordinate values of the reference pixels as the three-dimensional reference coordinate values.

3. The indoor positioning method as claimed in claim 2, wherein each of the reference feature points corresponds to a feature point pixel in the perspective image, and the step of calculating the three-dimensional coordinate values of the reference feature points base on the three-dimensional reference coordinate values comprises:

obtaining a first reference pixel corresponding to the feature point pixel in the vertical axis direction and a second reference pixel corresponding to the feature point pixel in the horizontal axis direction; and calculating a three-dimensional coordinate value of the feature point pixel based on the three-dimensional reference coordinate value of the first reference pixel and the three-dimensional reference coordinate value of the second reference pixel.

4. The indoor positioning method as claimed in claim 1, wherein the indoor map is generated in an off-line mode, and the off-line mode is a state without connection to the Internet.

5. The indoor positioning method as claimed in claim 1, wherein the indoor map is stored in a positioning database, and the step of determining the three-dimensional target coordinate value of the portable electronic device with respect to the origin of the indoor map in the indoor environment comprises:

obtaining a real-time image by the portable electronic device, and extracting a plurality of target feature points of the real-time image and descriptors of the target feature points;

comparing the descriptors of the reference feature points and the descriptors of the target feature points, and if a distance value between the descriptors of the reference feature points and the descriptors of the target feature points are smaller than a predetermined threshold value, retrieving the three-dimensional coordinate values of the reference feature points whose distance value with respect to the descriptors of the target feature points are smaller than the predetermined threshold value from the positioning database; and calculating the three-dimensional target coordinate value and a rotational angle of the portable electronic device based on the three-dimensional coordinate values of the reference feature points retrieved from the positioning database.

6. The indoor positioning method as claimed in claim 5, wherein determining the three-dimensional target coordinate value of the portable electronic device in the indoor environment with respect to the origin is performed in an on-line mode, and the on-line mode is a state with connection to the Internet, wherein the step before comparing the descriptors of the reference feature points and the descriptors of the target feature points further comprises:

determining the indoor environment of the portable electronic device through the Internet, and downloading the indoor map corresponding to the indoor environment to the portable electronic device.

7. An indoor positioning system, comprising:

a camera device, configured to shoot a panorama image corresponding to an indoor environment;

a portable electronic device; and an indoor map establishing device, connected to the camera device, wherein the indoor map establishing device comprises:

a storage device, storing a positioning database; and a processor, coupled to the storage device, wherein the processor is configured to convert the panorama image into a plurality of perspective images and extract a plurality of reference feature points in the perspective images and descriptors of the reference feature points, wherein the processor is further configured to take a shooting position of the panorama image as an origin and record a plurality of three-dimensional reference coordinate values corresponding to a central position of each of the perspective images, wherein the processor is further configured to calculate three-dimensional coordinate values of the reference feature points base on the three-dimensional reference coordinate values, and store an indoor map corresponding to the indoor environment and formed by the three-dimensional coordinate values of the reference feature points and the descriptors of the reference feature points in the positioning database, wherein the portable electronic device is configured to determine a three-dimensional target coordinate value of the portable electronic device with respect to the origin of the indoor map in the indoor environment.

8. The indoor positioning system as claimed in claim 7, wherein the processor is further configured to obtain a plurality of reference pixels of the central position of each of the perspective images in a vertical axis direction and a horizontal axis direction, and record three-dimensional coordinate values of the reference pixels as the three-dimensional reference coordinate values.

9. The indoor positioning system as claimed in claim 8, wherein each of the reference feature points corresponds to a feature point pixel in the perspective image, and the processor is further configured to obtain a first reference pixel corresponding to the feature point pixel in the vertical axis direction and a second reference pixel corresponding to the feature point pixel in the horizontal axis direction, and wherein the processor is further configured to calculate a three-dimensional coordinate value of the feature point pixel based on the three-dimensional reference coordinate value of the first reference pixel and the three-dimensional reference coordinate value of the second reference pixel.

10. The indoor positioning system as claimed in claim 7, wherein the portable electronic device is further configured to obtain a real-time image, and extract a plurality of target feature points of the real-time image and descriptors of the target feature points, wherein the portable electronic device is further configured to determine the indoor environment of the portable electronic device through the Internet, and download the indoor map corresponding to the indoor environment to the portable electronic device, wherein the portable electronic device is further configured to compare the descriptors of the reference feature points and the descriptors of the target feature points, and if a distance value between the descriptors of the reference feature points and the descriptors of the target feature points are smaller than a predetermined threshold value, retrieve the three-dimensional coordinate values of the reference feature points whose distance value with respect to the descriptors of the target feature points are smaller than the predetermined threshold value from the positioning database, and wherein the portable electronic device is further configured to calculate the three-dimensional target coordinate value and a rotational angle of the portable electronic device based on the three-dimensional coordinate values of the reference feature points retrieved from the positioning database.

11. The indoor positioning system as claimed in claim 7, wherein the processor is operated in an off-line mode and the portable electronic device is operated in an on-line mode, and the off-line mode is a state without connection to the Internet, whereas the on-line mode is a state with connection to the Internet.

12. An indoor map establishing device, comprising:
a storage device, storing a positioning database; and
a processor, coupled to the storage device, wherein the processor is operated in an off-line mode and configured to:
receive a panorama image corresponding to an indoor environment;
convert the panorama image into a plurality of perspective images;
take a shooting position of the panorama image as an origin and record a plurality of three-dimensional reference coordinate values corresponding to a central position of each of the perspective images;
extract a plurality of reference feature points in the perspective images and descriptors of the reference feature points; and
calculate three-dimensional coordinate values of the reference feature points base on the three-dimensional reference coordinate values recorded, and store an indoor map corresponding to the indoor environment and formed by the three-dimensional coordinate values of the reference feature points and the descriptors of the reference feature points in the positioning database.

13. The indoor map establishing device as claimed in claim 12, wherein the processor is further configured to obtain a plurality of reference pixels of the central position of each of the perspective images in a vertical axis direction and a horizontal axis direction, and record three-dimensional coordinate values of the reference pixels as the three-dimensional reference coordinate values.

14. The indoor map establishing device as claimed in claim 13, wherein each of the reference feature points corresponds to a feature point pixel in the perspective image, and the processor is further configured to obtain a first reference pixel corresponding to the feature point pixel in the vertical axis direction and a second reference pixel corresponding to the feature point pixel in the horizontal axis direction, and wherein the processor is further configured to calculate a three-dimensional coordinate value of the feature point pixel based on the three-dimensional reference coordinate value of the first reference pixel and the three-dimensional reference coordinate value of the second reference pixel.

15. The indoor map establishing device as claimed in claim 12, wherein the off-line mode is a state without connection to the Internet.

* * * * *